United States Patent
Zink et al.

(10) Patent No.: US 10,812,601 B2
(45) Date of Patent: Oct. 20, 2020

(54) METHOD AND SYSTEM FOR SIGNALING AND RADIO CONNECTION OPTIMIZATION OVER A CELLULAR NETWORK

(71) Applicant: Flash Networks, Ltd., Herzliya (IL)

(72) Inventors: Roland Zink, Neu-Anspach (DE); Dror Shlomo, Kiryat Tivon (IL)

(73) Assignee: FLASH NETWORKS LTD., Herzliya (IL)

(*) Notice: Subject to any disclaimer, the term of this patent is extended or adjusted under 35 U.S.C. 154(b) by 46 days.

(21) Appl. No.: 15/902,654

(22) Filed: Feb. 22, 2018

(65) Prior Publication Data

US 2018/0262577 A1 Sep. 13, 2018

Related U.S. Application Data

(60) Provisional application No. 62/467,953, filed on Mar. 7, 2017.

(51) Int. Cl.
| | | |
|---|---|---|
| *H04L 29/08* | (2006.01) | |
| *H04L 29/06* | (2006.01) | |
| *H04L 1/16* | (2006.01) | |
| *H04W 24/10* | (2009.01) | |
| *H04L 1/18* | (2006.01) | |

(52) U.S. Cl.
CPC .......... *H04L 67/145* (2013.01); *H04L 1/1848* (2013.01); *H04W 24/10* (2013.01); *H04L 1/1685* (2013.01); *H04L 1/1858* (2013.01); *H04L 69/163* (2013.01)

(58) Field of Classification Search
CPC ............... H04L 67/145; H04L 43/0811; H04L 12/1877; H04L 12/1881; H04L 49/90; H04L 67/14; H04L 1/1887; H04L 2001/0097; H04L 47/10; H04L 47/11; H04L 47/12; H04L 47/193; H04L 47/2466; H04L 69/163; H04L 63/1408; H04L 65/4069; H04L 41/147; H04L 43/062;

(Continued)

(56) References Cited

U.S. PATENT DOCUMENTS

| | | | | |
|---|---|---|---|---|
| 6,788,924 B1 * | 9/2004 | Knutson | ............... | H04B 7/2681 455/265 |
| 7,359,326 B1 * | 4/2008 | Harper | .................. | H04L 1/0086 370/235 |

(Continued)

OTHER PUBLICATIONS

How SACK Transmissions Improve Web Performance; Catchpoint; Jun. 17, 2014; pp. 1-6 (Year: 2014).*

*Primary Examiner* — Backhean Tiv
*Assistant Examiner* — Linh T. Nguyen
(74) *Attorney, Agent, or Firm* — Smith Tempel Blaha LLC; Gregory Scott Smith

(57) ABSTRACT

A technique, to keep alive one or more radio connections over a cellular network in order to carry downloaded data packets sent in a burst mode, is disclosed. In burst mode the flow of the data packets has a pattern with repeating two types of periods, an active period and a silent period. During an active period a plurality of data packets are sent and during a silent period almost no data packets are sent. The technique is implemented by an intermediate network element (NE) that is configured to send, during the silent period, a keep-alive signal (KAS) toward a relevant CD. The KAS can be a TCP acknowledgement, for example.

29 Claims, 6 Drawing Sheets

(58) Field of Classification Search
CPC ....... H04L 69/22; H04L 43/08; H04L 43/022; H04L 1/1854; H04L 5/0082; H04W 76/25
USPC ........ 709/203, 227, 238, 219, 249; 370/260, 370/312
See application file for complete search history.

(56) References Cited

U.S. PATENT DOCUMENTS

| | | | | |
|---|---|---|---|---|
| 7,561,593 B1* | 7/2009 | Wilkie | ................. | H04L 45/026 370/346 |
| 9,268,384 B2* | 2/2016 | Scott | ...................... | H04L 12/12 |
| 2003/0110286 A1* | 6/2003 | Antal | ..................... | H04L 47/36 709/236 |
| 2003/0188007 A1* | 10/2003 | Unger | .................... | G06F 13/28 709/232 |
| 2005/0058131 A1* | 3/2005 | Samuels | ................. | H04L 41/00 370/389 |
| 2005/0198350 A1* | 9/2005 | Tan | ......................... | G06F 15/01 709/232 |
| 2005/0281204 A1* | 12/2005 | Karol | .................... | H04L 43/50 370/248 |
| 2007/0019547 A1* | 1/2007 | Ho | ..................... | H04L 12/6418 370/230 |
| 2009/0067438 A1* | 3/2009 | Tsukamoto | ............. | H04L 47/10 370/400 |
| 2009/0252072 A1* | 10/2009 | Lind | .................... | H04W 76/25 370/311 |
| 2010/0067376 A1* | 3/2010 | Lee | ..................... | H04L 12/2885 370/230 |
| 2011/0093542 A1* | 4/2011 | Lau | ..................... | H04L 65/1083 709/206 |
| 2011/0161489 A1* | 6/2011 | Bhatt | .................... | H04L 45/245 709/224 |
| 2011/0191414 A1* | 8/2011 | Ma | ........................ | H04L 65/608 709/203 |
| 2013/0035082 A1* | 2/2013 | Sen | ..................... | H04L 65/4069 455/414.4 |
| 2013/0089015 A1* | 4/2013 | Choong | ............ | H04W 52/0212 370/311 |
| 2013/0151717 A1* | 6/2013 | Undery | ................... | H04L 29/06 709/227 |
| 2014/0198732 A1* | 7/2014 | Rysgaard | .............. | H04W 48/12 370/329 |
| 2014/0269401 A1* | 9/2014 | Gondi | .................... | H04L 12/26 370/253 |
| 2014/0321376 A1* | 10/2014 | Damnjanovic | ... | H04W 72/1215 370/329 |
| 2015/0271755 A1* | 9/2015 | Karri | ................. | H04W 52/0229 370/252 |
| 2016/0277957 A1* | 9/2016 | Patel | ................. | H04W 52/0229 |
| 2016/0295381 A1* | 10/2016 | Metzger | ................... | H04W 4/10 |
| 2017/0244623 A1* | 8/2017 | Cociglio | ............. | H04L 43/0858 |
| 2017/0272999 A1* | 9/2017 | Tsai | ............. | H04W 40/005 |
| 2017/0366465 A1* | 12/2017 | Mutoh | .................... | H04L 47/25 |
| 2018/0132270 A1* | 5/2018 | Zeng | ........................ | H04L 1/12 |
| 2018/0367282 A1* | 12/2018 | Li | .................... | H04W 72/0446 |

* cited by examiner

METHOD AND SYSTEM FOR SIGNALING AND RADIO CONNECTION OPTIMIZATION OVER A CELLULAR NETWORK

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on Mar. 7, 2017 and assigned Ser. No. 62/467,953, which application is incorporated herein by reference in its entirety

FIELD OF THE DISCLOSURE

The present disclosure generally relates to the field of data communication over a packet switch network such as an Internet Protocol (IP) network. More particularly the disclosure relates to communicating IP packets over a cellular network such as but not limited to General Packet Radio Service (GPRS), Universal Mobile Telecommunications System (UMTS) or Long-Term Evolution (LTE) network.

DESCRIPTION OF BACKGROUND ART

It is well known to a person with ordinary skill in the art that power consumption of a mobile device is an important feature. Therefor in unused services, common mobile device are turned off or placed in a power saving state (idle). An example embodiment of a mobile device can be a cellular phone, smartphone, etc. In LTE networks the radio part power consumption can be reduced by going into a Radio-Resource Control (RRC) idle state. However, switching from off state or idle state to on state (connected state) require extra signaling and control messages to be transferred over-the-air (OTA) between the mobile device and a base station. The signaling causes overhead in the mobile network and power usage on the device. In addition, the RRC messages impact the amount of the users that can be served, at the same time, by the cellular network.

There are some applications, in which the involved IP server transmits the data packets toward a receiving cellular device (CD) in groups. Along the present disclosure and the claims the term burst mode represents a flow of packets that has a pattern with repeating two types of periods, an active period and a silent period. During the active period the data is transmitted over a plurality of packets toward the CD. During the silent period, there is no traffic toward the receiving CD. In some cases the silent period can take few seconds, five to fifteen seconds for example. Sending the data in a burst mode, may lead the receiving CD to switch to RRC idle state during the silent period. An example of a web site that uses burst mode can be YouTube. YouTube is a trademark owned by Goggle Inc. USA.

BRIEF SUMMARY

The needs and the deficiencies that are described above are not intended to limit the scope of the inventive concepts of the present disclosure in any manner. The needs are presented for illustration only. The disclosure is directed to a novel technique for reducing the power consumption of a mobile device over a cellular network such as but not limited to GPRS, UMTS or LTE network. As well as decreasing the amount of RRC messages over the air and within the mobile operator's access network, this enables serving more users at the same time over the cellular network.

An example embodiment of the present disclosure can be implemented by a Network Element (NE). An example of NE can be located in a GPRS, or in a UMTS, or an LTE Access-Network-Operator Premises (ANOP) in between an access gateway (AGW) and an Internet-Network Gateway (I-GW), etc. An example of an AGW for an LTE network can be a Serving-Gateway (SGW) or Packet Data Network Gateway (P-GW).

For the purposes of simplicity and readability the present disclosure related in more details to an LTE access network as an example of an access network, however a person having an ordinary skill in the art can adapt the disclosed technique to other type of cellular access networks.

An example embodiment of NE can be adapted to operate in burst mode. Such an example embodiment can be configured to send a keep-alive signal (KAS) toward a receiving CD. The KAS prevents the CD to switch to an idle state during the silent period between two consecutive bursts of packets. An example of KAS can comprise a TCP acknowledgement (ACK). An example acknowledgement can be an ACK that doesn't cause a response. Another type of keep-alive message can cause a response acknowledgement message. An example of KAS can be a duplicate ACK indicating that packets arrive out of order or are potentially lost. Such a kind of ACK does not reduce the transmitting rate unless it is repeated 3 times. TCP/IP or just TCP stands for Transmission Control Protocol over Internet Protocol network or just Transmission Control Protocol, respectively.

Some example embodiments of the NE can be configured to send the KAS after a certain period of time from the last packet that was transmitted to or from the CD. The certain period of time between the last packet and sending the KAS can be adapted to the time-out (TO) interval that is used by the type of the relevant cellular network, 3G, LTE, etc. . . . A timer that is used to determine when to send the KAS can be reset each time a packet is obtained from the server or from the CD.

Other example embodiments of the disclosed NE can be configured to modify each obtained burst of packets into two or more sub-bursts. A first sub-burst can comprise a first group of packets from the obtained burst and the second sub-burst can comprise the rest of the packets of the obtained burst. The time interval between two consecutive obtained bursts can be divided into substantially equal two sub-intervals. The first sub-burst can be send substantially close to the time of obtaining the obtained burst and the second sub-burst can be sent at the beginning of the second sub-interval. A person having an ordinary skill in the art can adapt the disclosed technique to other number of sub-bursts.

Some example embodiments of the disclosed NE can be configured to identify session that uses burst mode by using database that comprises a list of websites that uses burst mode. Other embodiments may analyze the behavior of the session in order to determine whether it is in a burst mode or not. Analyzing the behavior of the session can be based on the amount of traffic, duration of the session, looking for "holes" in the traffic, etc. A website that does not appear in the list but was detected during analyzing the session, that it uses burst mode can be added to the list.

The foregoing summary is not intended to summarize each potential embodiment or every aspect of the present invention, and other features and advantages of the present invention will become apparent upon reading the following detailed description of few example embodiments with the accompanying drawings and appended claims.

Furthermore, although specific example embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the disclosed embodiments with the accompanying drawings and appended claims.

BRIEF DESCRIPTION OF THE DRAWING

Exemplary embodiments of the present disclosure will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the several views, in which exemplary embodiments of the present disclosure are described. For convenience, only some elements of the same group may be labeled with numerals. The purpose of the drawings is to describe typical embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware.

In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module.

Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

Figure 1:
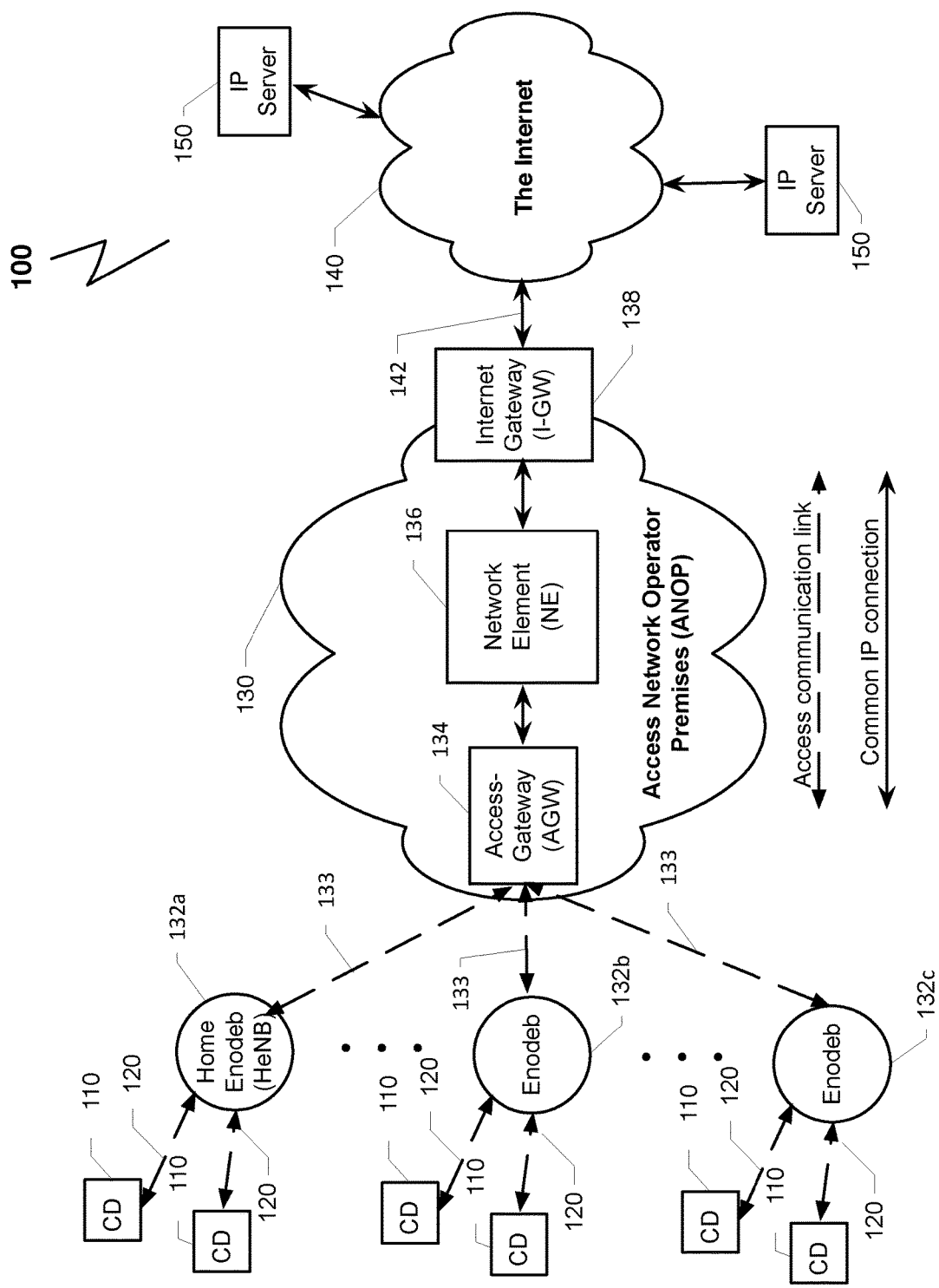
FIG. 1 illustrates a block diagram with relevant elements of an example Access Network Operator Premises (ANOP) in which an embodiment of the present disclosure can be implemented.

FIG. 1 depicts a block diagram with relevant elements of a typical cellular communication system 100 in which an exemplary embodiment of the present disclosure can be implemented. Cellular communication system 100 can be configured to handle data-packet traffic over TCP/IP network, for example. Communication system 100 can comprise an Access Network Operator Premises (ANOP) 130, a plurality of cellular-devices (CD) 110, a plurality of intermediate nodes 132a-c, the Internet 140, and one or more IP servers 150. The intermediate nodes 132a-c can comprise: Home Enodeb (HeNB) 132a; and Enodeb 132b&c, for example.

An example of ANOP 130 can be the access network of a GPRS cellular operator, LTE cellular operator, etc. The ANOP 130 can be connected to the Internet 140 via an Internet-gateway (I-GW) 138 and a communication link 142.

A few non-limiting examples of typical cellular-device (CD) 110 can be: a laptop, a mobile phone, a PDA (personal digital assistance), a smart phone, a tablet computer, one or more type of sensors, connected vehicles, Internet-of-Things (IOT), etc. Each CD 110 may employ a browser application. Following are few not limiting examples of browser applications: Firefox (a trade name of Mozilla), Apple-Safari (a trade name of Apple Inc.), Google-Chrome (a trade name of Google Inc.), "EDGE" (a trade name of Microsoft Corporation.) etc.

A CD 110 can be connected to an access gateway (AGW) 134 via intermediate nodes such as Enodeb 132b&c or Home enodeb (HeNB) 132a and a backhaul network 133. A non-limiting example of an AGW 134 can be an S-GW or P-GW. Along the disclosure and the claims the term AGW and S-GW/P-GW can be used interchangeably. The connection between a CD 110 and the intermediate nodes 132a-c can be implemented by cellular links 120.

An ANOP 130 can provide different services to a plurality of CDs 110. Few non-limiting examples of services provided by an ANOP 130 can include: spam filtering, content filtering, bandwidth consumption distribution, transcoding, rating adaptation, power saving etc. An example ANOP 130, which is configured to implement an example embodiment of the disclosed technique, may comprise one or more AGW 134, a NE 136, and Internet gateway (I-GW) 138. An example of AGW 134 can be such as but not limited to P-GW.

In some embodiments of the disclosed technique (not shown in the figures) example embodiments NE 136 can be installed over the communication link 142 between the I-GW 138 and the Internet 140, for example.

Among other tasks, an example of AGW 134 can be configured to identify whether a requesting CDs 110 is a subscriber of the cellular operator and accordingly can determine whether the subscriber is allowed to get the required access to the network and what services the subscriber is entitled to receive, for example. In addition the AGW 134 can be adapted to process the data traffic to or from the identified CDs 110 via the one or more intermediate nodes 132*a-c*. In the direction from the CD 110 toward the internet 140, the AGW 134 can be configured to transfer IP traffic toward the NE 136. An example AGW 134 can be an S-GW for an LTE network, another example of AGW can be P-GW. In addition, the AGW 134 may participate in a process of allocating one or more public IP addresses to the requesting CD 110 to be used during the current access session.

In some embodiments of system 100 the AGW 134 can be configured to handle the mobility management of CDs 110 and implement signaling channel over the backhaul network 133 for paging and mapping each CD 110 to its currently associated Enodeb 132*a-c*. The I-GW 138, at the other side of ANOP 130 can be a router, for example. The I-GW can route IP data packets to and from the plurality of IP servers 150 via the Internet 140. The communication between the I-GW 138 and the Internet 140 can be based on Internet protocol (IP).

An example embodiment of NE 136 can be adapted to operate in burst mode. Such an example embodiment of NE 136 can be configured to send a keep-alive signal (KAS) toward a receiving CD 110. The sent KAS prevents the CD 110 to switch to an idle state during the silent period between two consecutive bursts of packets. An example of KAS can comprise a Selective ACK (SACK) followed by a Duplicate-Selective ACK (DSACK). Another example of KAS can be just an ACK message.

Another example of NE 136 can be configured to modify each obtained burst of packets into two or more sub-bursts. A first sub-burst can comprise a first group of packets from the obtained burst and the second sub-burst can comprise the rest of the packets of the obtained burst. The time interval between two consecutive obtained bursts can be divided into substantially equal two sub-intervals. The first sub-burst can be send toward the relevant CD 110 substantially close to the time of obtaining the obtained burst from one of the servers 150. The second sub-burst can be sent at the beginning of the second sub-interval. Other embodiments of NE 136 can be configured to modify each obtained burst of packets into three or more sub-bursts. More information on the operation of an example of NE 136 is disclosed below in conjunction with FIG. 2 to FIG. 5.

Figure 2:
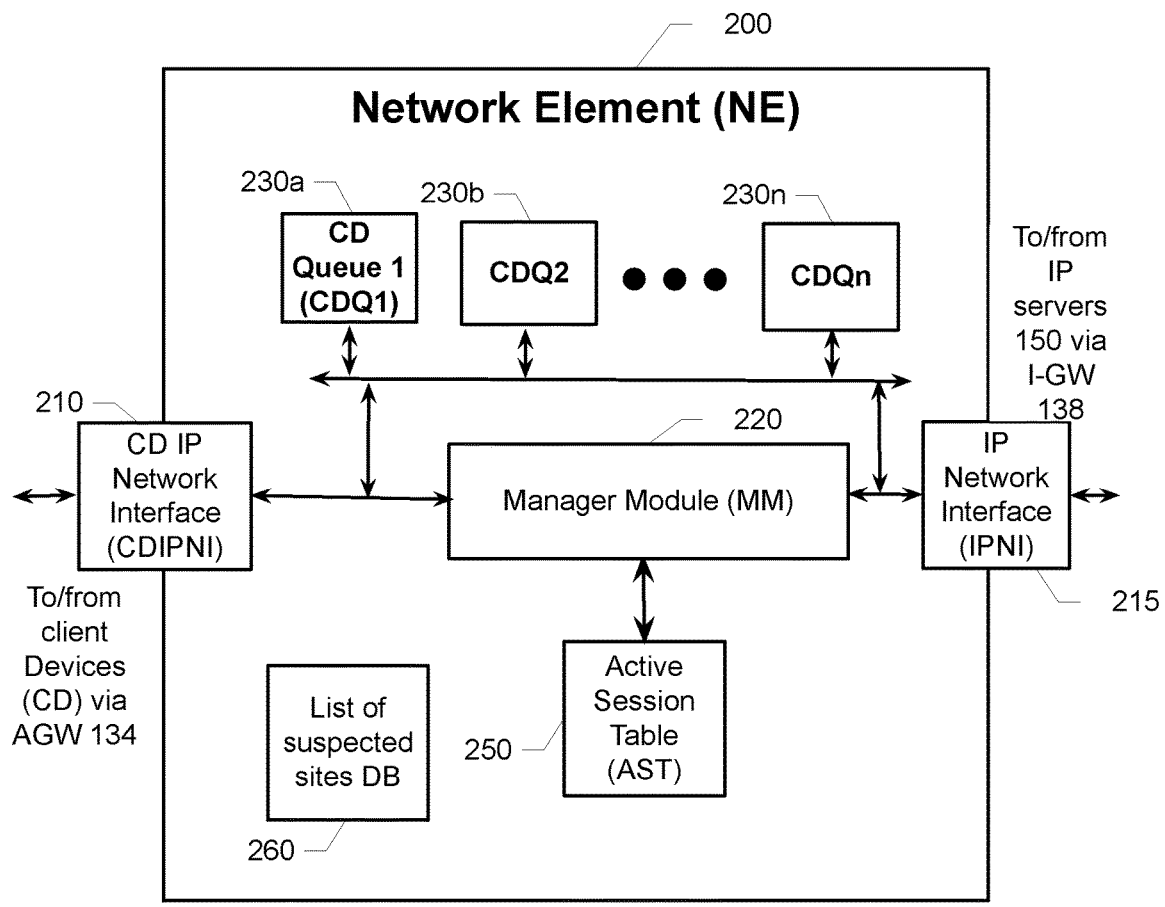
FIG. 2 illustrates a block diagram with relevant elements of an example of a Network Element (NE), according to the teaching of the present disclosure.

FIG. 2 depicts a block diagram with relevant elements of an example embodiment of a NE 200. An example embodiment of NE 200 may comprise one or more processors, computer readable medium such as but not limited to a read/write hard disc, CDROM, Flash memory, ROM, or other memory or storage devices, etc. Software of a logical module may be embedded on one of the computer readable medium. In order to execute a certain task, a software program may be loaded to an appropriate processor as needed. An example of an NE 200 can comprise few logical modules such as but not limited to a Manager-Module (MM) 220; an active session table (AST) 250, which is stored in a memory device; a CD IP network interface (CDIPNI) 210; one or more queues, CDQ1 to CDQn 230*a-n*; IP network interface (IPNI) 215, and a list of suspected Database 260, for example. Each queue 230*a-n* can be stored in one or more memory devices or all the queues can be stored in the same memory device.

IP packets obtained from CD 110 via the AGW 134 (FIG. 1) can be parsed by CDIPNI 210. Based on the header of the packet, the CDIPNI 210 can define the session to which the packet belongs. A session can be identified by the IP destination and source IP addresses and ports or other session detection methods. Then, the AST 250 can be searched looking for an entry that is associated with that session. If an entry does not exist, which means that the session is a new one, then the CDIPNI 210 can allocate an entry for the new session in the AST 250. Next, the relevant fields of that entry can be updated. Fields such as but not limited to destination and source IP addresses and ports number; an indication on one of the CDQ 230*a-n* that was allocated to that session; domain name; the time of sending or receiving the last packet to or from the relevant CD 110; the time of sending the first KAS; time of sending the second KAS; etc.

If an entry exists in the AST then the data in that entry can be parsed and the packet can be transferred toward the relevant CDQ. In addition the relevant entry can be updated with the appropriate information. Information such as the obtaining time, etc. Then, the packet or a pointer to the packet can be transferred toward the queue of the MM 220 and a trigger can be sent to the MM 220. In an alternate embodiment, if an entry, in AST 250, does not exist, then the CDIPNI 210 may transfer the packet to the queue of the MM 220 and sent a trigger to the MM 220. In such embodiment the MM 220 can be configured to implement a process which is similar to the process disclosed in the above paragraph in conjunction with CDIPNI 210. More information about the operation of CDIPNI 210 is disclosed below in conjunction with FIG. 4.

IP packets obtained from IP servers 150 via the I-GW 138 (FIG. 1) can be parsed by IPNI 215. Based on the header of the packet, the IPNI 215 can define the session to which the packet belongs. Then, the AST 250 can be searched looking for an entry that is associated with that session. Based on the found entry the packet can be transferred toward the relevant queue CDQ 230*a-n* and the relevant entry of the AST 250 can be updated with information such as the address in the relevant CDQ 230*a-n* in which the packet was stored, the obtaining time, etc. Then, a trigger can be sent to the MM 220.

Some embodiments of NE 200 can be associated with a database 260 that among other information may comprise a list of domains that may downloads the data toward a receiving CD in a burst mode.

An example of MM 220 can comprise one or more processors, state machines, registers; internal one or more clocks, etc. An example embodiment of MM 220 may use timers. The timers can be set to a configurable value in the range of few tens of milliseconds to few hundreds of milliseconds, 70 to 120 milliseconds, for example. An example of MM 220 can be configured to manage the entire operation of the NE 200. During initiation, MM 220 can allocate the computing and the storage (memory volume) resources per each module of NE 200. In some embodiments the MM 220 can be further configured to handle new sessions that are not recorded in the AST 250. In such embodiment, an example of MM 220 can be configured to operate according to an example method, which is disclosed below in conjunction with FIG. 3. In addition MM can be configured to identify sessions that are downloaded in burst mode as it is illustrated in more details in FIG. 5.

Figure 3:
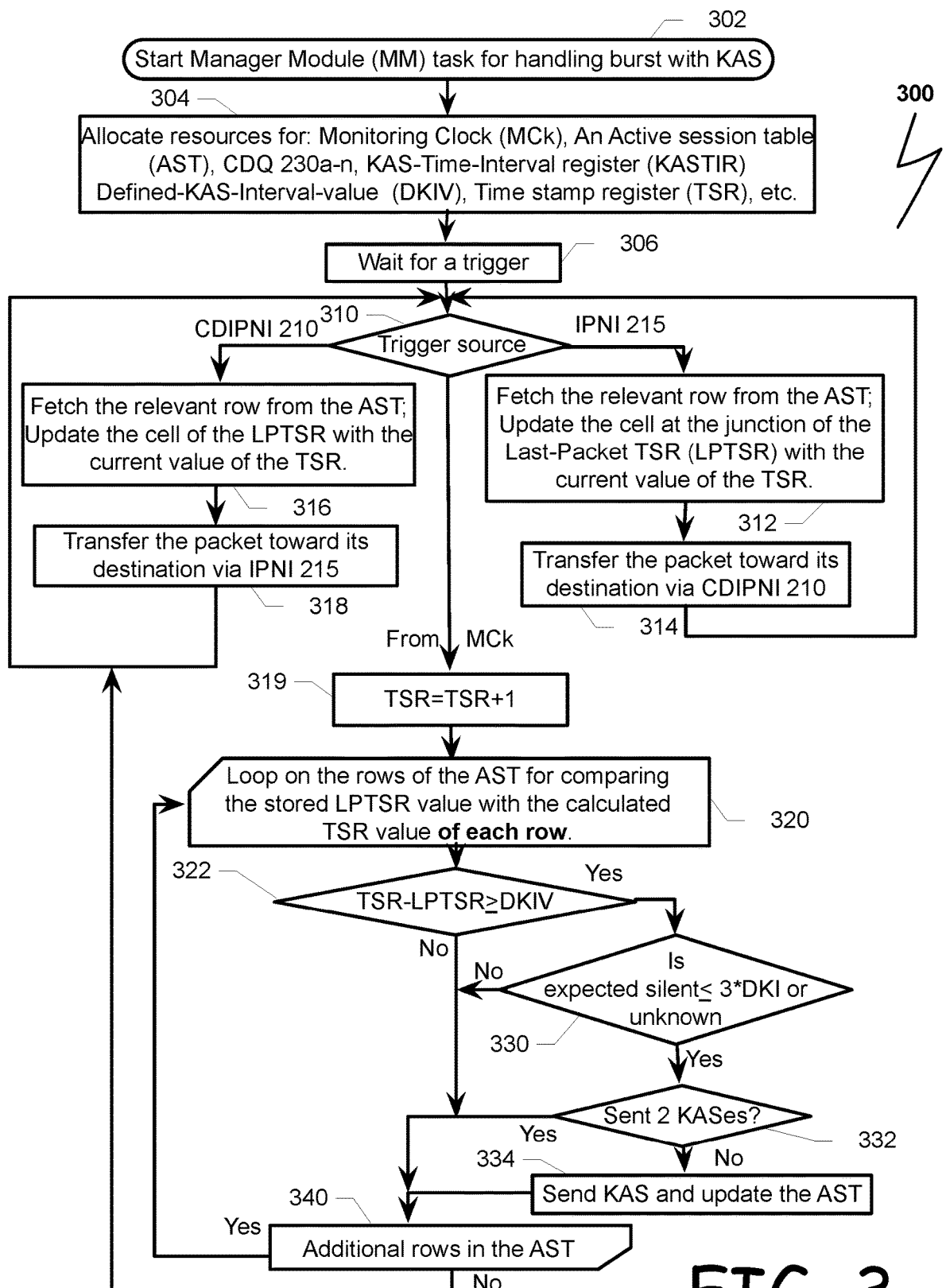
FIG. 3 illustrates a flowchart with relevant actions of an example process that can be implemented by an example manager module, of an NE, for handling downloaded session that uses burst mode operation.

FIG. 3 illustrates a flowchart with relevant elements of an example process that can be implemented by an example MM 220 (FIG. 2) for handling downloaded session that uses burst mode. In general, the process can be initiated after power on and be executed as long as the NE 200 is active. Upon initiation 302 resources for handling the disclosed method can be allocated 304. Resources such as but not limited to storage resources, timers, registers, computing resources, networking resources, etc. A KAS-interval value (KASIV) register can be set to the value of the KAS time interval. The value of the KAS-time-interval can be a configurable value, which can be dependent on the type of the network, 3G, LTE, etc. In addition, a monitoring clock MCk can be allocated. The MCk can have a clock in the range of few tens of milliseconds to few hundreds of milliseconds, 70 to 120 milliseconds, for example. After allocating the resources process 300 may wait 306 for a trigger.

Upon obtaining a trigger a decision can be made 310 whether the trigger was related to a packet, which was obtained from one of the CDs 120 (FIG. 1) via the CDIPNI 210 (FIG. 2); or was related to a packet, which was obtained from one of the servers 150 (FIG. 1) via the IPNI 215 (FIG. 2); or was related to the monitoring clock (MCk). If 310 the trigger was obtained from CDIPNI 210, then at block 316 the MM 220 (FIG. 2) can fetch the relevant entry from the AST 250 (FIG. 2). The relevant entry can be defined by the source and destination IP addresses and IP ports, for example. In some embodiments the entry can be define by the value of the session identifier (session ID).

The fetched entry can be parsed looking for a cell at the junction of the Last-Packet TSR column and the row that is associated with the relevant session. TSR stands for time-stamp-register. Then, the current value of the TSR can be stored in the LPTSR cell of the AST. Next the packet can be transferred 318 toward the relevant server 150 (FIG. 1) via the IPNI 215 (FIG. 2) and process 300 can return to block 310 waiting for the next trigger.

If 310 the trigger is related to a packet that was obtained from IPNI 215 (FIG. 2), which means that a packet was obtained from one of the servers 150 (FIG. 1), then at block 312 the MM 220 (FIG. 2) can fetch the relevant entry from the AST 250 (FIG. 2). The fetched entry can be parsed looking for a cell at the junction of the Last-Packet TSR (LPTSR) column and the relevant session. Next, the current value of the TSR can be stored in the LPTSR cell of the AST and the packet can be transferred 314 toward the relevant CD 110 (FIG. 1) via the CDIPNI 210 (FIG. 2) and process 300 can return to block 310 waiting for the next trigger.

In some embodiments of NE 200, transferring a packet (blocks 314, 318, for example) from one internal block of NE 200 to another internal block, can be implemented by placing a pointer to the address of that packet in one of the CDQa 230a-n. The pointer can be placed in a queue that is associated with CDIPNI 210 or IPNI 215 or MM 220 (FIG. 2), for example. Each queue can be implemented by a First-In-First-Out (FIFO) memory device, for example.

If 310 the source of the trigger is MCk, then at block 319 the TSR can be incremented by one. Next, a loop between block 320 to 340 can be initiated. In each cycle of the loop another row (active session) of the AST 250 (FIG. 2) can be analyzed. At block 322 the time interval between the current value of the TSR and the value of the LPTSR stored at the field of that entry of AST 250 can be compared 322 with the value of defined-KAS-interval value (DKIV). The DKIV can be dependent on the relevant CD, and the relevant cellular network, for example. In some embodiment the DKIV can be a configurable value in the range of few seconds, 5-15 seconds, ten seconds for example.

If 322 the time interval is equal or greater than the value of DKIV, then at block 330 a decision can be made whether the expected-silent period is smaller than three times the DKIV or is unknown. If 330 not, which means that the expected pattern of that session comprises long silent periods therefor there is no reason to send a KAS, then process 300 proceed to block 340.

If 330 the expected silent period is smaller or unknown, then at block 332 the MM 220 determines whether two KASs were sent toward the relevant CD. If yes, process 300 may proceed to block 340. If 332 no, then a KAS can be sent 334 toward the relevant CD and the relevant entry of the AST can be updated with indication that a KAS was sent toward that CD and process 300 continues to block 340. The expected-silent period can be retrieved from database or from example computed based video bitrate, burst length and current network bandwidth.

At block 340, a decision can be made whether additional row exist in the AST 250. If there is an additional row, then process 300 can return to block 320 for handling the next row (the next session). If 340 there are no additional rows, then the loop is terminated 340 and process 300 can return to block 310 waiting for the next trigger.

Some embodiments of MM 220 (FIG. 2) may use a slightly different process from the disclosed process 300 in order to handle the KAS in burst mode. Such embodiment MM 220 may not wait for a trigger as illustrated in block 306, instead MM 220 may be configured to run in a loop checking one CDQ 230a-n (FIG. 2) after the other looking for a new obtained packet. If a new packet exists in one of the CDQ 230a-n, then MM 220 may handle the new packet in a similar way as it is illustrated in blocks 312 up to 340 of FIG. 3.

Figure 4:
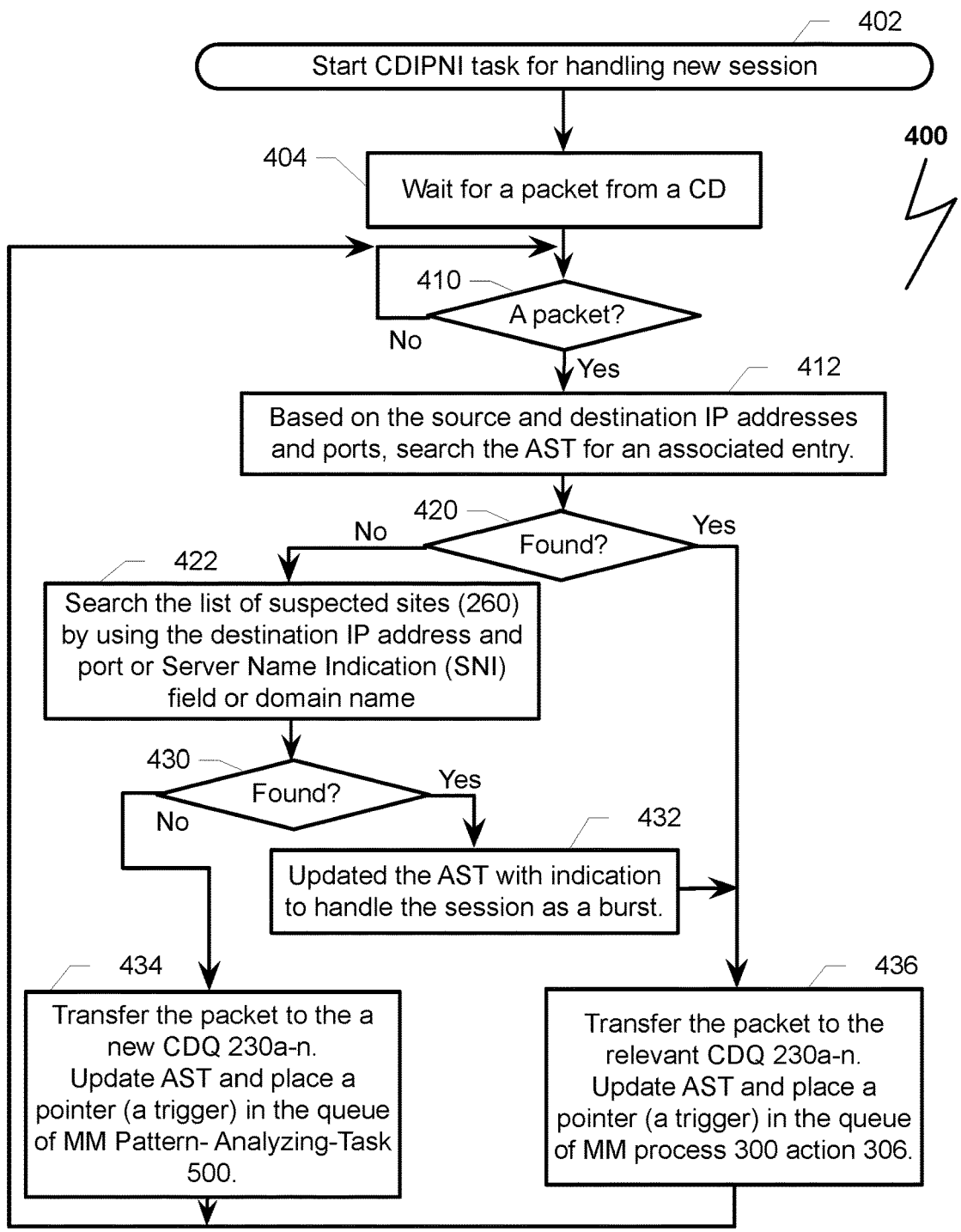
FIG. 4 illustrates a flowchart with relevant actions of an example process that can be implemented by an example CDIPNI module for handling a new session.

Referring now to FIG. 4 that illustrates a flowchart with relevant actions of an example process 400. Process 400 can be implemented by an example CDIPNI 210 (FIG. 2) for handling a new session, which is initiated by one of the CDs 110 (FIG. 1). In general, process 400 can be initiated after power on and be executed as long as the NE 200 (FIG. 2) is active. Upon initiation 402, resources for handling the disclosed method can be allocated. Resources such as but not limited to storage resources, timers, registers, computing resources, networking resources, etc. After allocating the resources, process 400 may wait 404 for obtaining a packet from one of the CDs 110 (FIG. 1) via AGW 134 (FIG. 1).

Upon obtaining 410 a packet, the header of the packet can be parsed 412 and based on the source and destination IP addresses and ports the AST 250 (FIG. 2) can be searched 412 in order to find an entry that was associated with that connection. If 420 an entry exists, which means that the packet belong to an existing session, then the packet can be transferred 436 toward the allocated CDQ 230a-n (FIG. 2), the queue that was allocated to that session. In some embodiments of NE 200 (FIG. 2) fields of the associated entry of the AST 250 can be updated. Fields such as but not limited to the LPTSR can be updated with the current value of the TSR. Next, a pointer to the stored packet can be transferred 436 toward the queue of MM 220 (FIG. 2). In some embodiment of process 300 (FIG. 3) placing a pointer at the queue of MM 220 can be used as the trigger of block 306 (FIG. 3). Then, process 400 may return to block 410 waiting for the next packet from one of the CDs 110 (FIG. 1).

Returning now to block 420, if an entry does not exist in the AST 250 (FIG. 2), which means that the packet belongs to a new session. Then, based on the destination IP addresses and ports or based on the domain name or based on the Server-Name Indication (SNI), the List-of-Suspected-Sites DB 260 (FIG. 2) can be searched 422 looking for an entry that is associated with the value of one of those parameters of the destination. If 430 an entry in the DB 260 was found, then at block 432 an entry in the AST 250 (FIG. 2) can be allocated for that session. The IP addresses and ports of the relevant server and the relevant CD 110 (FIG. 1) can be written in the appropriate fields of the allocated entry, an indication to handle the session as a burst mode session can be written in the appropriate field of the allocated entry of the AST 250. In addition the current value of the TSR can be written 432 in the LPTSR field of that entry of the AST. In some embodiments a CDQ 230a-n can be allocated for storing packets related to the new session, and process 400 can proceed to block 436.

If 430 an entry in the DB 260 does not exist, then at block 434 an entry in the AST 250 (FIG. 2) can be allocated for that session. The IP addresses and ports of the relevant server and the relevant CD 110 (FIG. 1) can be written in the appropriate fields of the allocated entry. In addition, the current value of the TSR can be written 434 in the LPTSR field of that entry in the AST. In some embodiments a CDQ 230a-n can be allocated 434 for storing packets related to the new session. Furthermore, in some embodiments of process 400 a flag for analyzing the pattern of the new session can be set in the allocated entry of the AST. Next, the packet can be transferred toward the allocated CDQ 230a-n and pointer, trigger, can be transferred to the queue of MM-Pattern-Analyzing Task 500. Then, process 400 can return to block 410 for handling the next packet.

In some embodiments of process 400, block 434 can be modified to measure the amount of data-bytes that are transferred toward the relevant CD 110 and the duration of the download session. If the amount of bytes exceeds a certain size-threshold and/or the duration of the session exceeds a certain time-threshold, then process 400 may set a flag for analyzing the pattern of the new session in the allocated entry of the AST. Next, the packet can be transferred toward the allocated CDQ 230a-n and pointer, trigger, can be transferred to the queue of MM-Pattern-Analyzing Task 500.

Figure 5A:
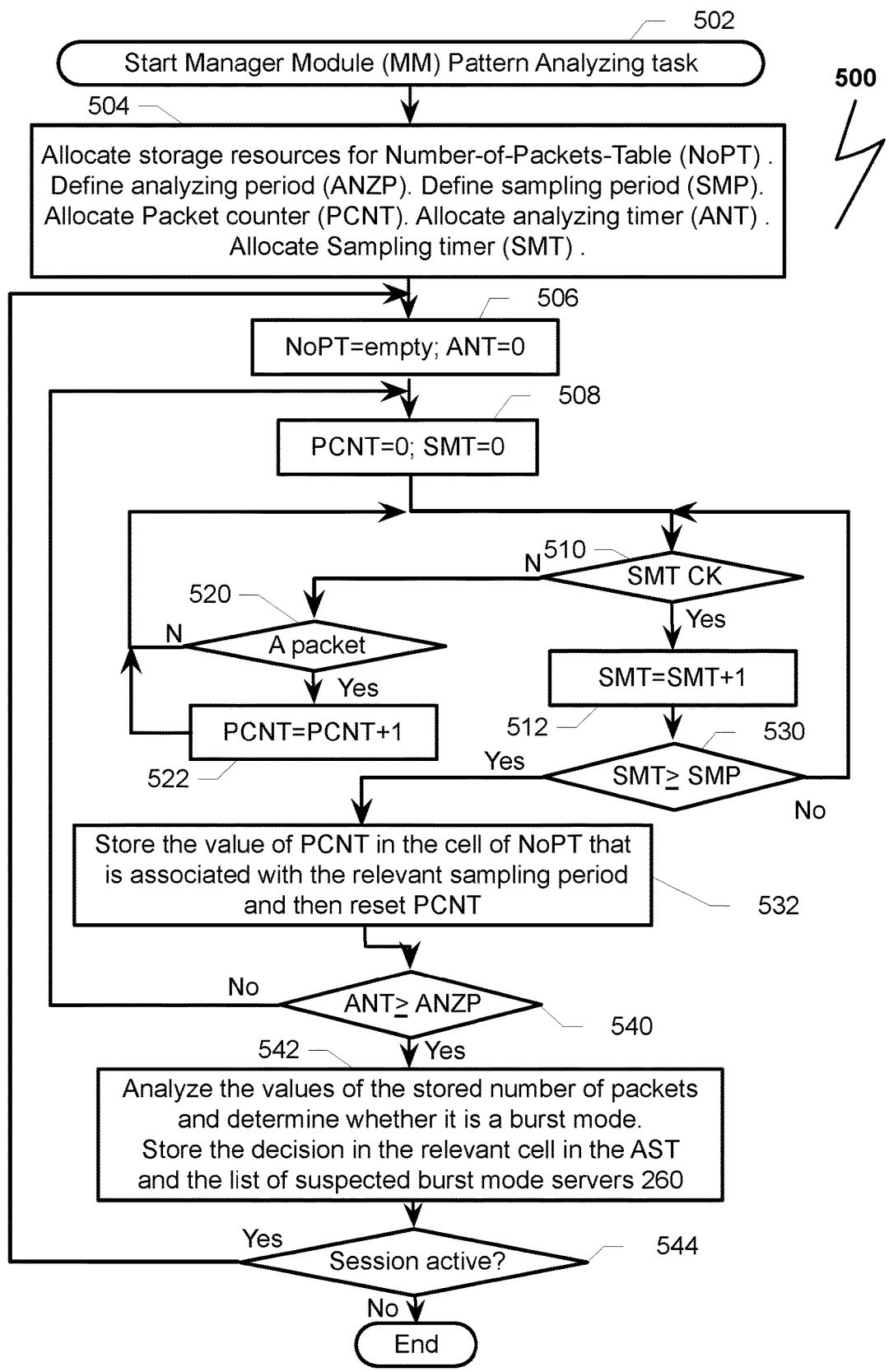
FIG. 5A illustrates a flowchart with relevant actions of an example of a process that can be implemented by an example NE for identifying burst mode.

FIG. 5A illustrates a flowchart with relevant actions of an example embodiment of a process 500. Process 500 can be implemented by an example NE 200 (FIG. 2) in order to determine whether a new download session is implemented in burst mode. Process 500 can be executed by an example of MM 220 (FIG. 2). The process can be initiated by an example of CDIPNI 210 (FIG. 2) at a beginning of a new download session. The new session can be from a server that does not have an entry in the database that contains the List-of-Suspected sites 260 for example, as it is disclosed above in conjunction with FIG. 4 block 434.

Upon initiation 502, resources for handling the disclosed method can be allocated 504. Resources such as but not limited to storage resources, registers, computing resources, networking resources, etc. Following are few examples of such resources: memory resources for storing a table that keeps records of the number of packets that were downloaded, Number-of-Packets Table (NoPT); timers for measuring the different time periods, such as but not limited to an analyzing timer (ANT) for monitoring the analyzing period (ANZP).

In some embodiments of process 500, instead of storing the number of downloaded packets in the NoPT, the number of downloaded bytes can be counted and stored in a Number-of-Bytes table (NoBT). A person having an ordinary skill in the art can adapt the disclosed technique to embodiments that use NoBT instead of NoPT.

The pattern of the downloading session can be analyzed during the ANZP in order to determine whether the new download session is in burst mode or not. The analyzing period is illustrated between blocks 506 to 542 of FIG. 5A. A sampling timer (SMT) can be allocated for monitoring the time interval in which the number of downloaded packets is counted. In some embodiment the number of bytes can be counted instead of the number of packets. An example value of ANZP can be in the range of few tens of seconds, 30 to 60 seconds for example. A common value of ANZP can be 40 seconds, for example. The SMT can be in the range of few hundreds of milliseconds, an example of SMT can be 100 milliseconds. Examples of SMT and ANT can be incremented continuously by ten milliseconds clock, for example.

At block 506 the values at the ANT can be reset and the different cells of the NoPT can be reset too. Each row of the NoPT can be associated with a session and each column can be associated with a sampling period. Thus, each cell can contain the number of packets that were counted during a certain sampling period of a certain session. Next, at block 508 the packet counter of each session can be reset, PCNT=0, as well as the SMT can be reset, SMT=0, and process 500 may check 510 if a leading edge of an SMT clock (SMT CK) was obtained. If 510 not, then at block 520 a decision is made whether a packet was obtained. If 520 a packet was obtained, then at block 522 the PCNT can be incremented by one and process 500 returns to block 510. If 520 no packet was obtained, then process 500 returns to block 510.

Upon obtaining 510 the leading edge of the next SMT CK, the SMT can be incremented 512 by one and a decision can be made 530 whether the SMT is equal or greater than the value of SMP. If 530 not, which means that the sampling period continues, then process 500 returns to block 510. If 530 the value of the SMT is equal or greater than the stored value of SMP, which means the end of the relevant sampling period, then the value of the PCNT can be stored 532 in the next column of the NoPT, the column that is associated with that sampling period.

Next, at block 540 a decision is made whether the timer ANT is equal or greater than the stored parameter ANZP that defines the analyzing period. If not, which means that the analyzing period continues, then the process 500 returns to block 508 for handling the next sampling period. If 540 the ANT is equal or greater than the stored parameter ANZP, which means the end of the analyzing period, then the process 500 continues to block 542. At block 542 process 500 may analyzes the stored values of the number of packets, which were obtained in each of the plurality of the sampling periods (SMP) and are stored in NoPT in order to determine whether the download session is implemented in burst mode or not.

In burst mode, the flow of packets can have a pattern having two repeating types of periods, an active period and a silent period. During the active period the data is transmitted over a plurality of consecutive packets toward the CD. During the silent period, there is no traffic toward the receiving CD or very few packets are transmitted over the connection with the CD. Thus, in order to define a silent period at block 542 an example process 500 may count the number of consecutive sampling periods (SMP) in which the number of obtained packets is a small number, less than few packets per SMP for example. An example of small number of packets can be in the range of 2-15 packets, seven packets for example. The number of counted consecutive SMP can be defined as a silent period.

In order to define an active period, at block 542 the example process 500 may count the number of consecutive sampling periods (SMP) in which the number of obtained packets is a large number of packets, few hundreds of packets for example. In some embodiments, if the number of packets is in the range of 100-800 packets, for example 300 packets, then process 500 can refer to that period as an active period. Finally, the ratio between the silent period and the active period can be calculated. If the silent period is N times greater than the active period, then the mode can be defined as a burst mode downloading. An example value of N can be in the range of 50 to 1000. An example value of the ratio can be 300 times.

Some embodiments off process 500 may further check, during block 542, the length of the silent period. If the length of the silent period is larger than few seconds, 10 to 30 seconds, for example, then an example embodiment of process 500 can be configured not to mark the session as a burst mode download session. In such embodiment the radio connection can be disconnected during the long silent periods.

After analyzing 542 the type of the download session, process 500 may store the decision in the relevant cell of the AST. In addition, if the download session is done in burst mode, the DB of the list of suspected sites 260 (FIG. 2) can be updated with indication that the relevant server can use burst mode.

Next, at block 544 a decision is made whether the session continues. If 544 yes, then the process 500 returns to block 506 and starts a new analyzing period. In some embodiments of process 500, the process may wait for a short period of time, 0.2 second to one second for example, before returning to block 506. If 544 the session is not active, then process 500 may terminated.

Figure 5B:
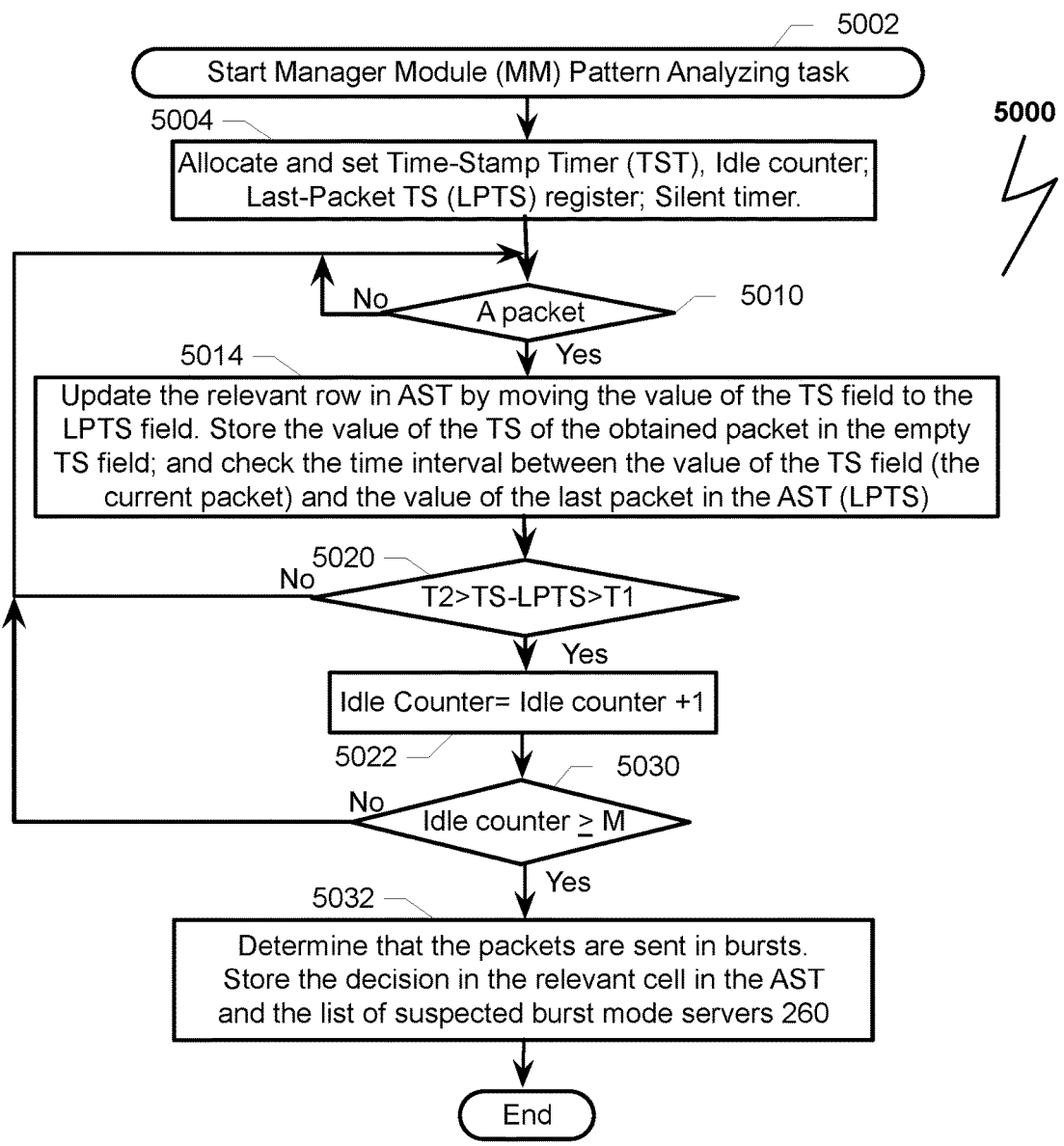
FIG. 5B illustrates a flowchart with relevant actions of another example of a process that can be implemented by an example NE for identifying burst mode.

FIG. 5B illustrates a flowchart with relevant actions of another example embodiment of an analyzing-process 5000. Process 5000 can be implemented by another example of NE 200 (FIG. 2) in order to determine whether a new download session is implemented in burst mode. Process 5000 can be executed by an example of MM 220. The process can be initiated by an example of CDIPNI 210 (FIG. 2) at a beginning of a new download session. The new session can be from a server that does not have an entry in the database that contains the List-of-Suspected sites 260 for example, as it is disclosed above in conjunction with FIG. 4 block 434.

Upon initiation 5002, resources for handling the disclosed method can be allocated 5004. Resources such as but not limited to storage resources, registers, computing resources, networking resources, etc. Following are few examples of such resources: memory resources for storing the time stamp register, the last packet time-stamp register; timers for measuring the different time periods, such as but not limited to an time-stamp timer (TST) for monitoring the time from the beginning of session; a silent timer, for measuring the duration of the silent periods, an idle-counter for counting the number of idle periods, in order to verify that the idle periods are repeated; etc.

Next, at block 5010 a decision is made whether a packet was obtained. If 5010 no packet was obtained, then process 5000 may wait for a packet. If 5010 a packet was obtained, then at block 5014 the relevant row in AST 250 (FIG. 2) can be updated. The value stored the TS field can be moved to the LPTS field and the value of the TS related to the obtained packet is stored in the TS field. In other embodiments of process 5000 a packet can be signaled by an interrupt to the processor of MM 220 (FIG. 2).

Next at block 5020 the time interval between the values that are stored in the field of the TS and the field of the LPTS can be compared. If 5020 the time interval is larger than T1 and smaller than T2, then the process 5000 proceeds to block 5022. If 5020 the time interval is not between T1 and T2, then process 5020 returns to block 5010. The value of T1 is a configurable value and it depends on the operator. The value of T1 can be in the range between 5-15 seconds. The value of T2 can be in between two to four times the value of T1.

At block 5022 the idle-counter can be incremented by one and a decision is made 5030 whether the value of the idle-counter larger than the value of a configurable parameter M. The value of M can be in the range of 2-5 idle periods. If 5030 no, then process 5000 moves to block 5010. If 5030 yes, then at block 5032 a decision is made that the packets are sent in burst mode and the relevant field in the AST can be updated accordingly. In addition the list of suspected in the DB 260 (FIG. 2) is updated by adding the relevant domain to the list and process 5000 can be terminated.

The present disclosure describes few examples of methods that can be used by a NE 136 for handling download session in which the packet are transferred in bursts. In addition the disclosed technique teaches an example method that can be used for identifying download session that is implemented in burst mode.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

The invention claimed is:

1. A method comprising:
   (a) employing, a network element (NE) that is communicatively coupled between a plurality of cellular devices (CDs) via a cellular network and a plurality of servers via an Internet Protocol (IP) network; and
   (b) configuring the NE to keep alive one or more radio connections that were established over the cellular network in order to connect a first CD from the plurality of CDs with a first server from the plurality of servers for downloading data packets in burst mode by modifying a burst of data packets into two or more sub-bursts, wherein each sub-burst comprises a group of data packets from the burst of data packets, sending the two or more sub-bursts along a time interval between a time of downloading a first data packet of the burst of data packets and a first data packet of a following burst of data packets; and (c) wherein, in burst mode a flow of the downloaded data packets has a pattern with repeating two types of periods, an active period in which a large number of data packets are downloaded and a silent period in which a small number of data packets are downloaded.

2. The method of claim 1, wherein the cellular network is a Long-Term Evolution (LTE) cellular network.

3. The method of claim 1, wherein the CD is a mobile phone.

4. The method of claim 1, wherein the action of configuring the NE to keep alive the one or more radio connections further comprising the action of determining whether the download data is implemented in burst mode.

5. The method of claim 4, wherein the action of determining whether the download data is implemented in burst mode is implemented by searching a database that comprises a list of servers that download data packets in burst mode.

6. The method of claim 1, wherein the small number of data packets is 15 or less of data packets.

7. The method of claim 1, wherein the large number of data packets is one hundred or more of data packets.

8. A network element (NE) that is communicatively coupled between a plurality of cellular devices (CDs) via a cellular network and a plurality of servers via an Internet Protocol (IP) network, the NE comprising:
   a. a manager module that is configured to:
      i. obtain information regarding data packets that are downloaded toward a first CD in a burst mode, wherein in burst mode a flow of data packets has a pattern with repeating two types of periods, an active period and a silent period, wherein during the active period a large number data packets are downloaded and during the silent period a small number of data packets are downloaded;
      ii. send, during the silent period, one or more keep alive signal (KAS) over one or more radio connections that were established with the first CD in order to carry the downloaded data packets;
      iii. wherein determining when to send the KAS is implemented by calculating a time interval between a current time and a time that a last data packet was transferred over the one or more radio connections of the first CD, if the calculated time interval exceeds a value of a defined period of time, sending a keep-alive signal (KAS) toward the first CD over the one or more radio connections; and
      iv. wherein the silent period is smaller than three times the defined period of time.

9. The network element (NE) of claim 8 wherein the large number of data packets comprises one hundred or more data packets.

10. The network element (NE) of claim 8 wherein the small number of data packets comprises 15 or less data packets.

11. A computer readable non-transitory medium containing executable instructions that when executed cause a processor, at network element (NE), wherein the NE is communicatively coupled between a plurality of cellular-device (CDs) over a cellular network and a plurality of webservers over an IP network, to:
   a. keep alive one or more radio connections that were established over the cellular network with a first CD from the plurality of CDs in order to download data packets in a burst mode from a first server from the plurality of webservers by modifying a burst of data packets into two or more sub-bursts, wherein each sub-burst comprises a group of data packets from the burst of data packets, sending the two or more sub-bursts along a time interval between a time of downloading a first data packet of the burst of data packets and a first data packet of a following burst of data packets;
   b. wherein in burst mode a flow of the data packets that is transmitted from the first server toward the first CD has a pattern with repeating two types of periods, an active period in which a large number of data packets are sent and a silent period in which a small number of data packets are sent.

12. The computer readable non-transitory medium of claim 11, wherein the cellular network is a Long-Term Evolution (LTE) cellular network.

13. The computer readable non-transitory medium of claim 11, wherein the small number of data packets is 15 or less of data packets.

14. The computer readable non-transitory medium of claim 11 wherein the large number of data packets comprises one hundred or more data packets.

15. A method comprising:
   (a) employing, a network element (NE) that is communicatively coupled between a plurality of cellular devices (CDs) via a cellular network and a plurality of servers via an Internet Protocol (IP) network; and
   (b) configuring the NE to keep alive one or more radio connections that were established over the cellular network in order to connect a first CD from the plurality of CDs with a first server from the plurality of servers for downloading data packets in burst mode by calculating a time interval between a current time and a time that a last data packet was transferred over the one or more radio connections of the first CD, if the calculated time interval exceeds a value of a defined period of time, sending a keep-alive signal (KAS) toward the first CD over the one or more radio connections; and
   (c) wherein, in burst mode a flow of the downloaded data packets has a pattern with repeating two types of periods, an active period in which a large number of data packets are downloaded and a silent period in which a small number of data packets are downloaded; and
   (d) wherein an expected silent period is smaller than three times the defined period of time.

16. The method of claim 15, wherein the KAS is a Transmission-Control Protocol (TCP) acknowledgement that doesn't cause a response.

17. The method of claim 16, wherein the KAS is a Selective ACK (SACK) followed by a Duplicate-Selective ACK (DSACK).

18. The method of claim 16, wherein no more than N consecutive KASs are sent, wherein N is an integer number ranging from two to five.

19. The method of claim 18, wherein the number of consecutive sent KAS is limited to three times.

20. The method of claim 15 wherein the large number of data packets comprises one hundred or more data packets.

21. The method of claim 15 wherein the small number of data packets comprises 15 or less data packets.

22. A computer readable non-transitory medium containing executable instructions that when executed cause a processor, at network element (NE), wherein the NE is communicatively coupled between a plurality of cellular-device (CDs) over a cellular network and a plurality of webservers over an IP network, to:
   (a) keep alive one or more radio connections that were established over the cellular network in order to connect a first CD from the plurality of CDs with a first server from the plurality of servers for downloading data packets in burst mode by calculating a time interval between a current time and a time that a last data packet was transferred over the one or more radio connections of the first CD, if the calculated time interval exceeds a value of a defined period of time, sending a keep-alive signal (KAS) toward the first CD over the one or more radio connections; and (b) wherein, in burst mode a flow of the downloaded data packets has a pattern with repeating two types of periods, an active period in which a large number of data packets are downloaded and a silent period in which a small number data packets are downloaded; and (c) wherein an expected silent period is smaller than three times the defined period of time.

23. The computer readable non-transitory medium of claim 22, wherein the KAS is a Transmission-Control Protocol (TCP) acknowledgement that doesn't cause a response.

24. The computer readable non-transitory medium of claim 23, wherein the KAS is a Selective ACK (SACK) followed by a Duplicate-Selective ACK (DSACK.

25. The computer readable non-transitory medium of claim 22, wherein no more than N consecutive KASs are sent, wherein N is an integer number ranging from two to five.

26. The computer readable non-transitory medium of claim 22, wherein the instruction to keep alive the one or more radio connections further comprising the instruction to determine whether the download data is implemented in burst mode.

27. The computer readable non-transitory medium of claim 26, wherein the instruction to determine whether the download data is implemented in burst mode comprises the instruction to search a database that comprises a list of servers that download data packets in burst mode.

28. The computer readable non-transitory medium of claim 22 wherein the large number of data packets comprises one hundred or more data packets.

29. The computer readable non-transitory medium of claim 22 wherein the small number of data packets comprises 15 or less data packets.

* * * * *